US011708066B2

(12) United States Patent
Cserna et al.

(10) Patent No.: US 11,708,066 B2
(45) Date of Patent: Jul. 25, 2023

(54) ROAD SURFACE CONDITION GUIDED DECISION MAKING AND PREDICTION

(71) Applicant: Motional AD LLC, Boston, MA (US)

(72) Inventors: Bence Cserna, East Boston, MA (US); Eric Wolff, Boston, MA (US); Shih-Yuan Liu, Arlington, MA (US)

(73) Assignee: Motional AD LLC, Boston, MA (US)

( * ) Notice: Subject to any disclaimer, the term of this patent is extended or adjusted under 35 U.S.C. 154(b) by 177 days.

(21) Appl. No.: 17/154,285

(22) Filed: Jan. 21, 2021

(65) Prior Publication Data

US 2022/0227353 A1 Jul. 21, 2022

(51) Int. Cl.
*B60W 30/02* (2012.01)
*B60W 40/06* (2012.01)
*G06V 20/56* (2022.01)

(52) U.S. Cl.
CPC ............ *B60W 30/02* (2013.01); *B60W 40/06* (2013.01); *B60W 2420/42* (2013.01); *B60W 2420/52* (2013.01); *B60W 2420/54* (2013.01); *B60W 2556/10* (2020.02); *G06V 20/56* (2022.01)

(58) Field of Classification Search
CPC .................................................... B60W 30/02
See application file for complete search history.

(56) References Cited

U.S. PATENT DOCUMENTS

| 10,467,482 | B2 * | 11/2019 | Lakehal-Ayat ........ H04N 7/188 |
| 10,528,851 | B2 * | 1/2020 | Zhu ........................ G08G 1/167 |
| 10,762,360 | B2 * | 9/2020 | Silver ................... G06V 10/762 |
| 11,305,777 | B2 * | 4/2022 | Batts ...................... G08G 1/202 |
| 2019/0164018 | A1 | 5/2019 | Zhu et al. |
| 2020/0160068 | A1 | 5/2020 | Silver et al. |
| 2020/0238999 | A1 | 7/2020 | Batts et al. |
| 2021/0213955 | A1 | 7/2021 | Zhao et al. |

FOREIGN PATENT DOCUMENTS

| JP | 2017-052414 | 3/2017 |
| JP | 2018-071318 | 5/2018 |
| KR | 2009-0047249 | 5/2009 |
| KR | 2013-0005107 | 1/2013 |
| KR | 2020-0127262 | 11/2020 |
| WO | WO 2017/100797 | 6/2017 |
| WO | WO 2017/101797 | 6/2017 |

* cited by examiner

*Primary Examiner* — Michael A Berns
(74) *Attorney, Agent, or Firm* — Fish & Richardson P.C.

(57) ABSTRACT

Among other things, techniques are described for receiving, from at least one sensor of a vehicle, sensor data associated with a surface along a path to be traveled by a vehicle; using a surface classifier to determine a classification of the surface based on the sensor data; determining, based on the classification of the surface, drivability properties of the surface; planning, based on the drivability properties of the surface, a behavior of the vehicle when driving near the surface or on the surface; and controlling the vehicle based on the planned behavior.

15 Claims, 15 Drawing Sheets

ROAD SURFACE CONDITION GUIDED DECISION MAKING AND PREDICTION

FIELD OF THE INVENTION

This description relates to road surface condition guided decision making and prediction.

BACKGROUND

Surfaces on which vehicles drive can vary along vehicle paths. For example, road surfaces along a vehicle path can include asphalt, concrete, rock, etc. These surfaces can also dynamically change under different conditions, such as weather conditions (e.g., rain, snow, sleet, etc.).

DETAILED DESCRIPTION

Figure 1:
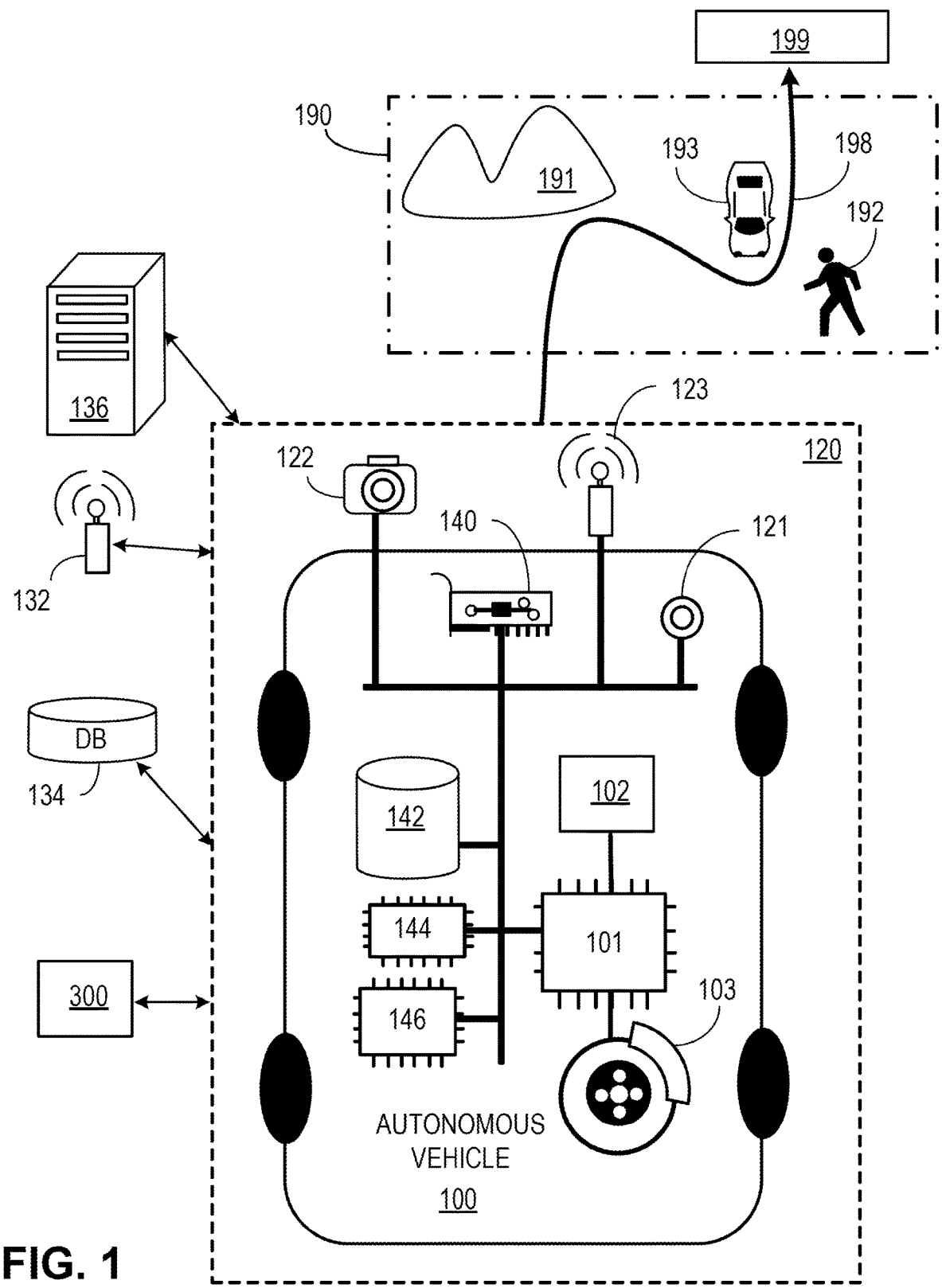
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships, or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
   2. System Overview
   3. Autonomous Vehicle Architecture
   4. Autonomous Vehicle Inputs
   5. Autonomous Vehicle Planning
   6. Autonomous Vehicle Control
   7. Surface Guided Decision Making General Overview Behavior of a vehicle is adapted based on dynamically changing road surfaces and conditions that impact safety and drivability. For example, sensor measurements are used to identify and categorize road surfaces. Based on the road surface category, the vehicle can determine the drivability properties of the surface, and can make appropriate planning decisions. Additionally, based on the drivability properties of the surface, the vehicle can predict the behavior of other vehicles that are driving on the surface and can proactively adjust its behavior accordingly. In this way, the vehicle can exhibit behaviors similar to that of a human driver in hazardous conditions, such as following existing tracks on the road when it is snowing or raining, avoiding ice patches, reducing speed, biasing within lanes, or changing lanes to avoid an obstacle on the road.

Adapting the behavior of a vehicle based on the dynamically changing road surfaces and conditions improves the safety and reliability of the vehicle, particularly when driving in hazardous environments. Additionally, recognizing that the behavior of other vehicles changes based on the dynamically changing road surfaces and conditions improves the accuracy of predicting the behavior of the other vehicles. This, in turn, reduces the chances of collisions and improves vehicle reliability and safety.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
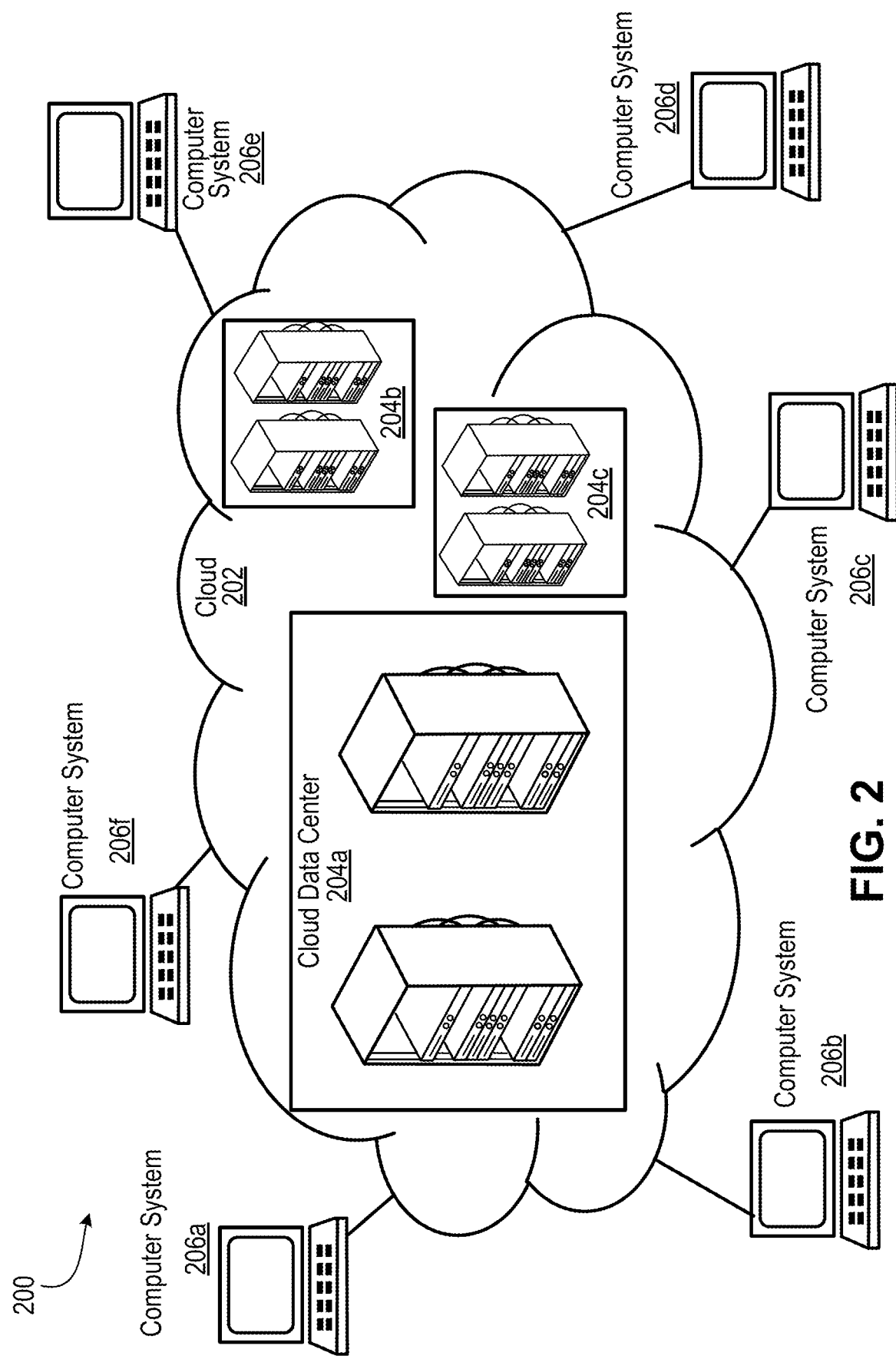
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
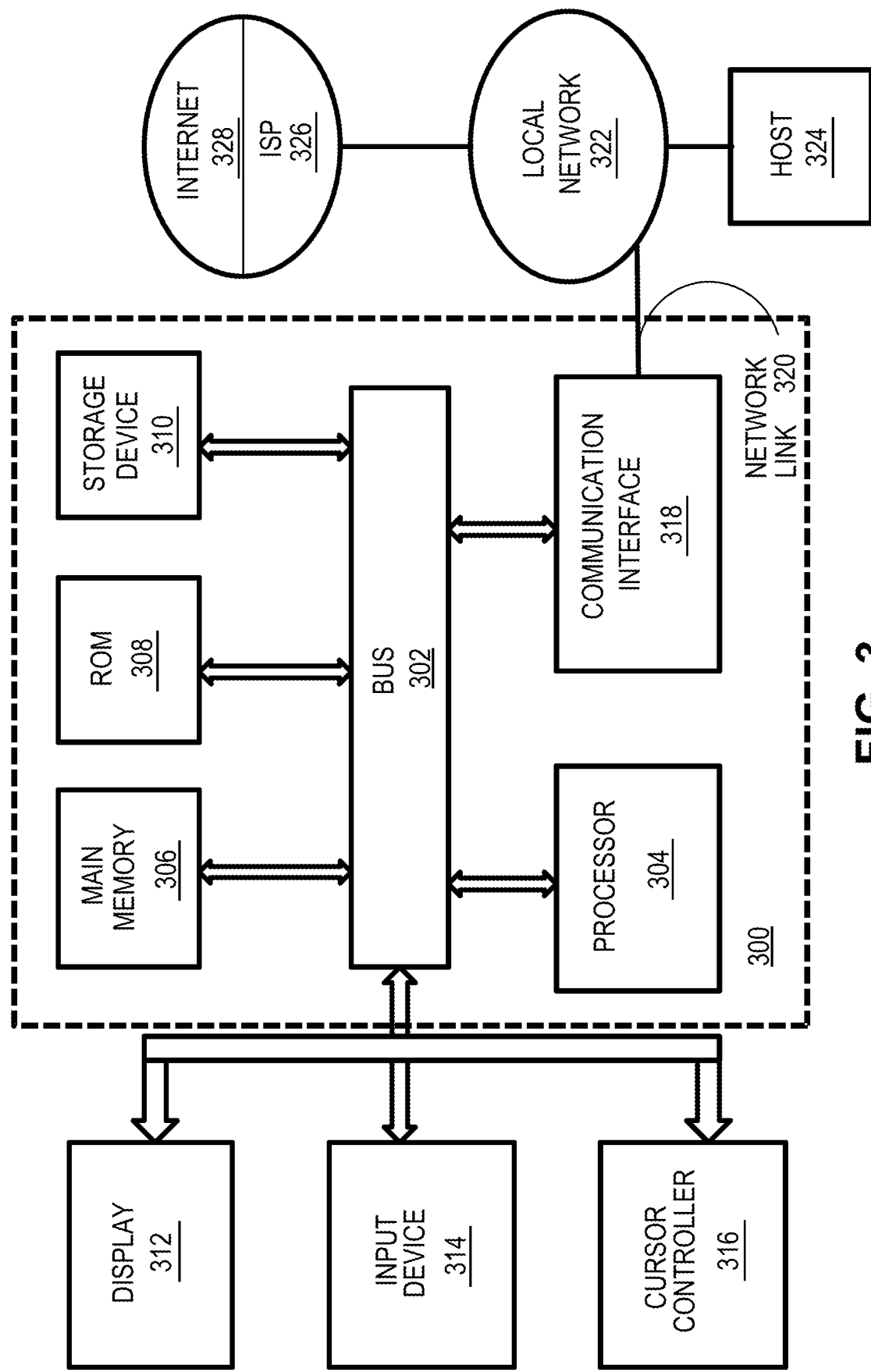
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
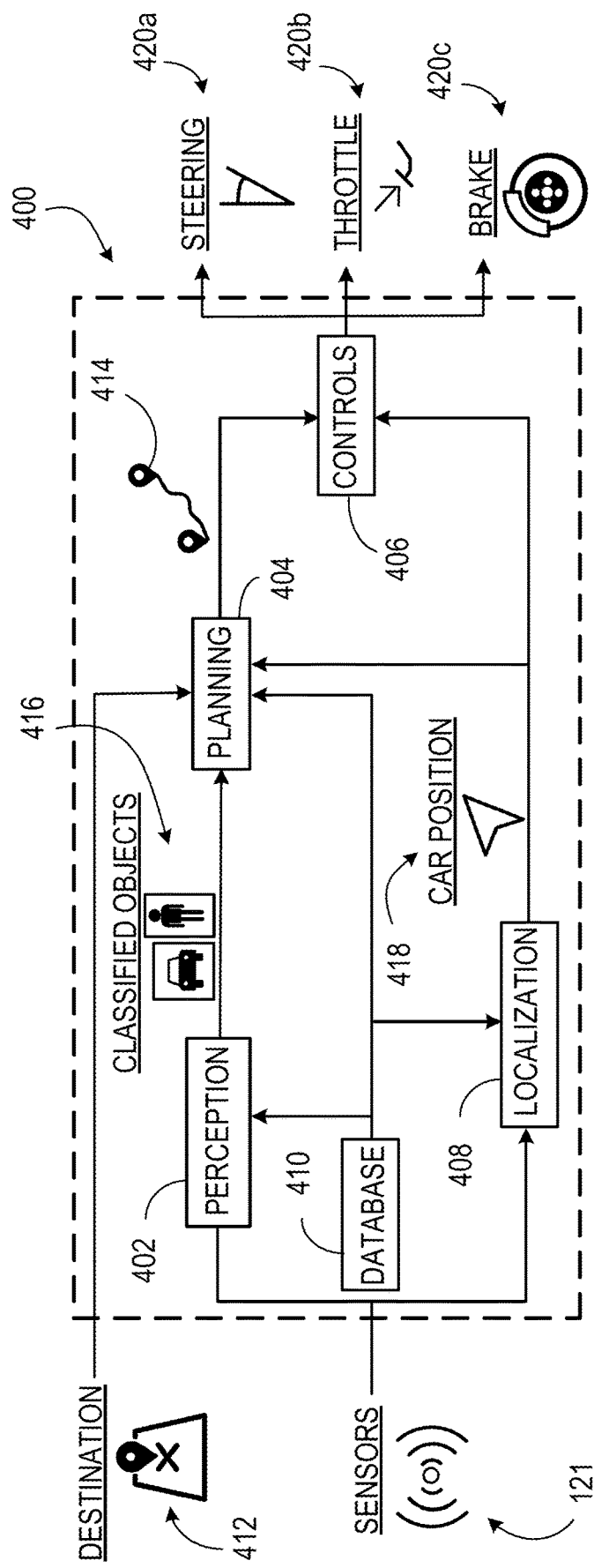
FIG. 4 shows an example architecture for an autonomous vehicle.

FIG. 4 shows an example architecture 400 for an autonomous vehicle (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
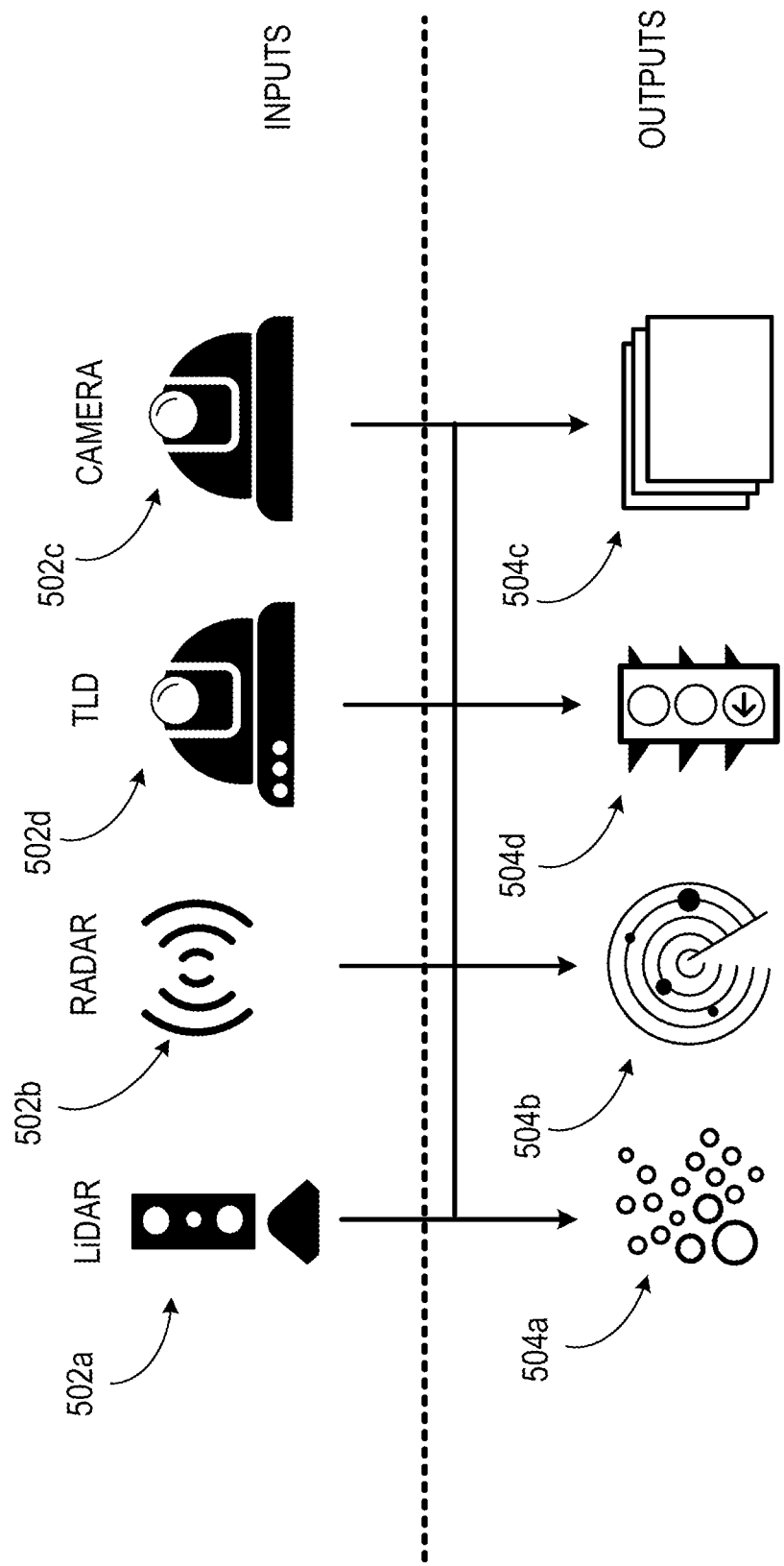
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
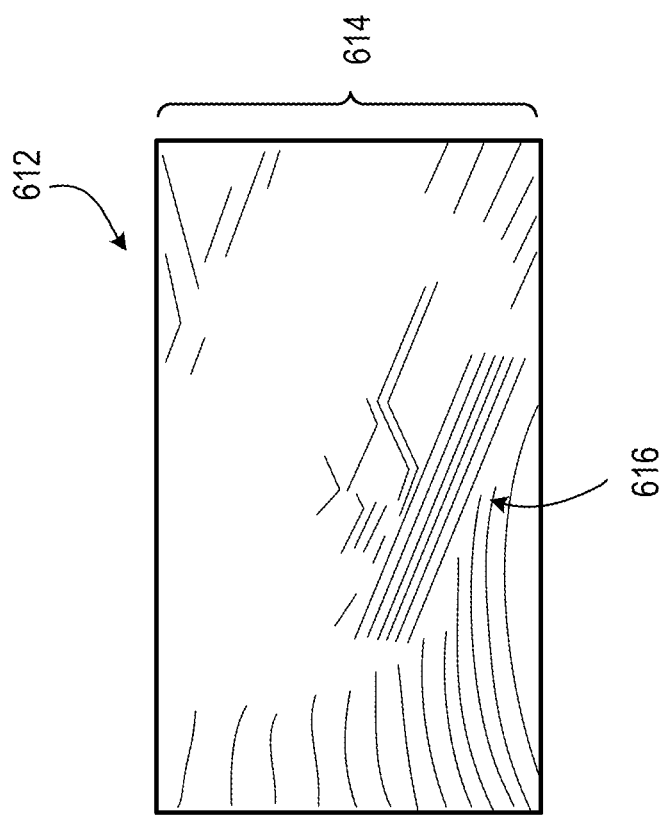
FIG. 6 shows an example of a LiDAR system.
Figure 6:
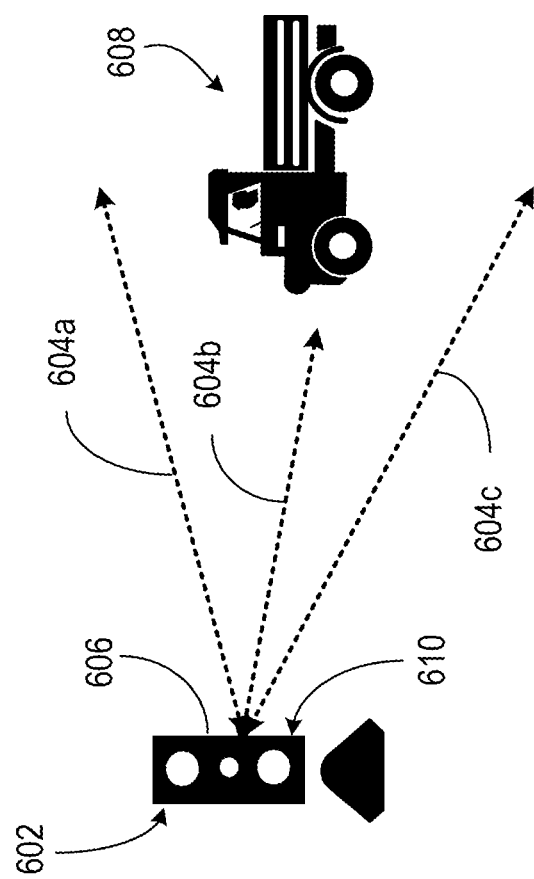

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
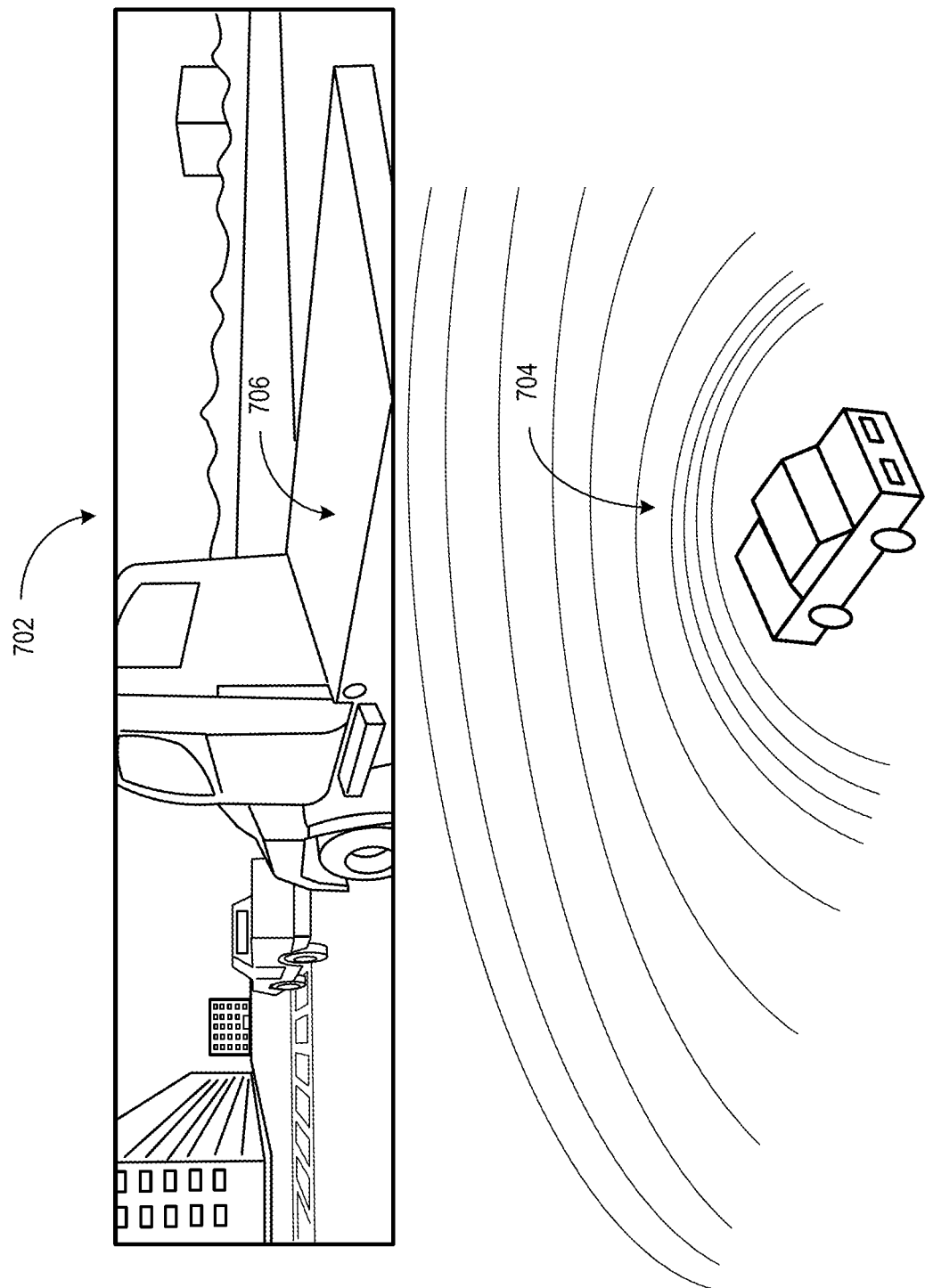
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
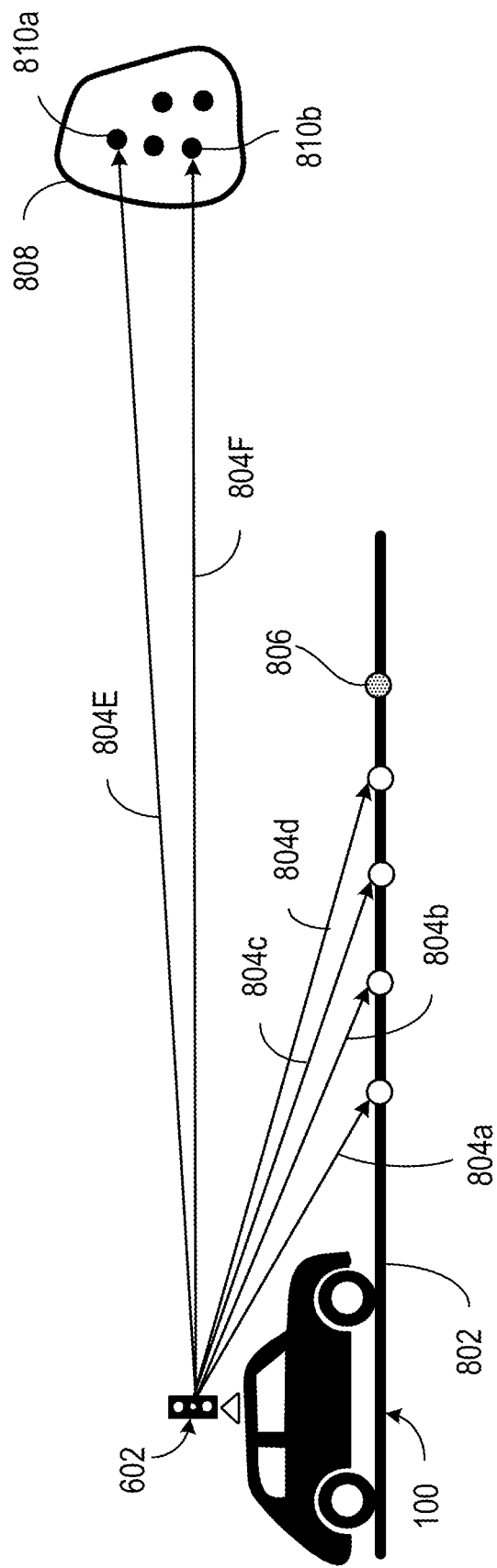
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Path Planning

Figure 9:
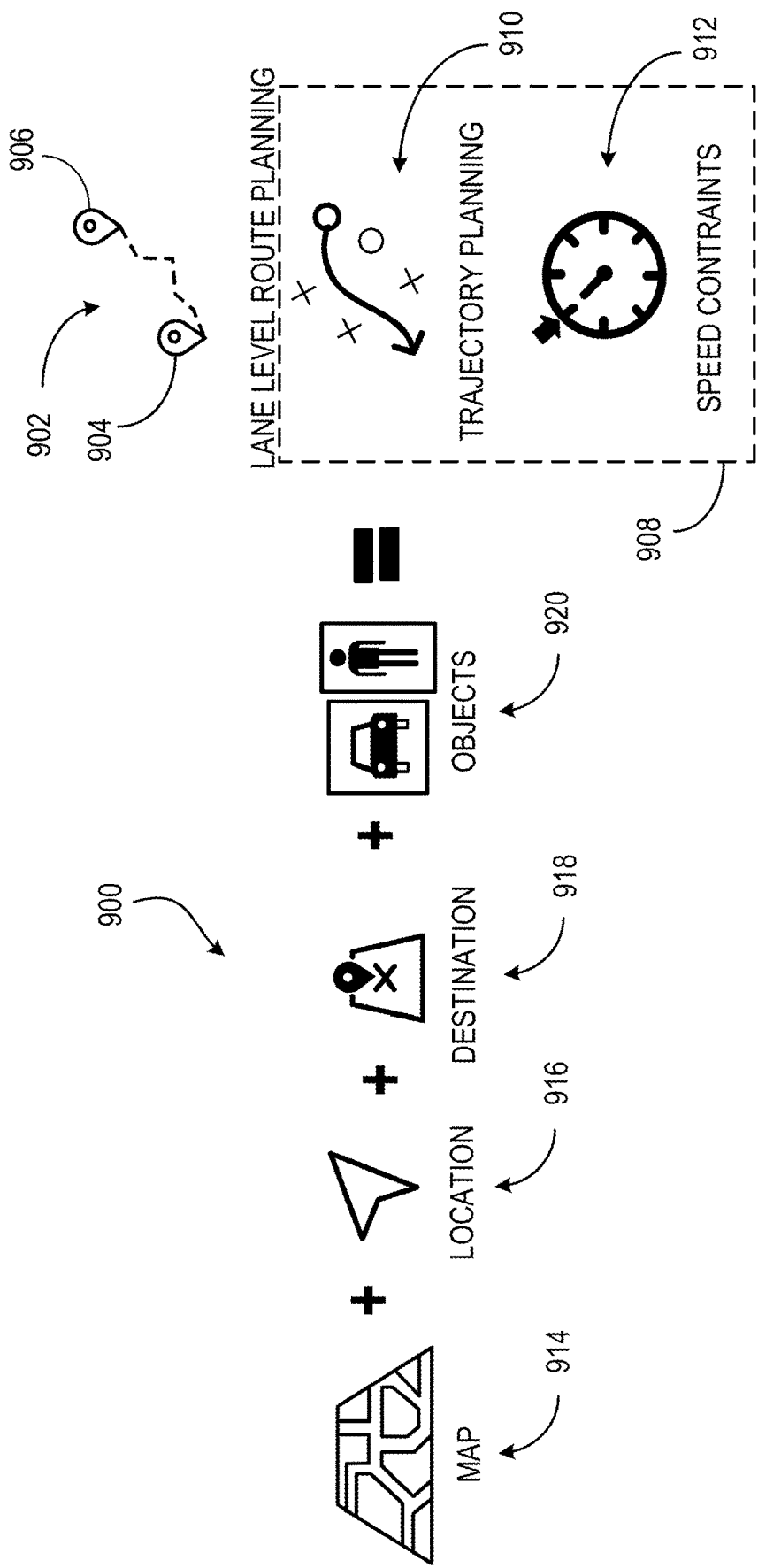
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
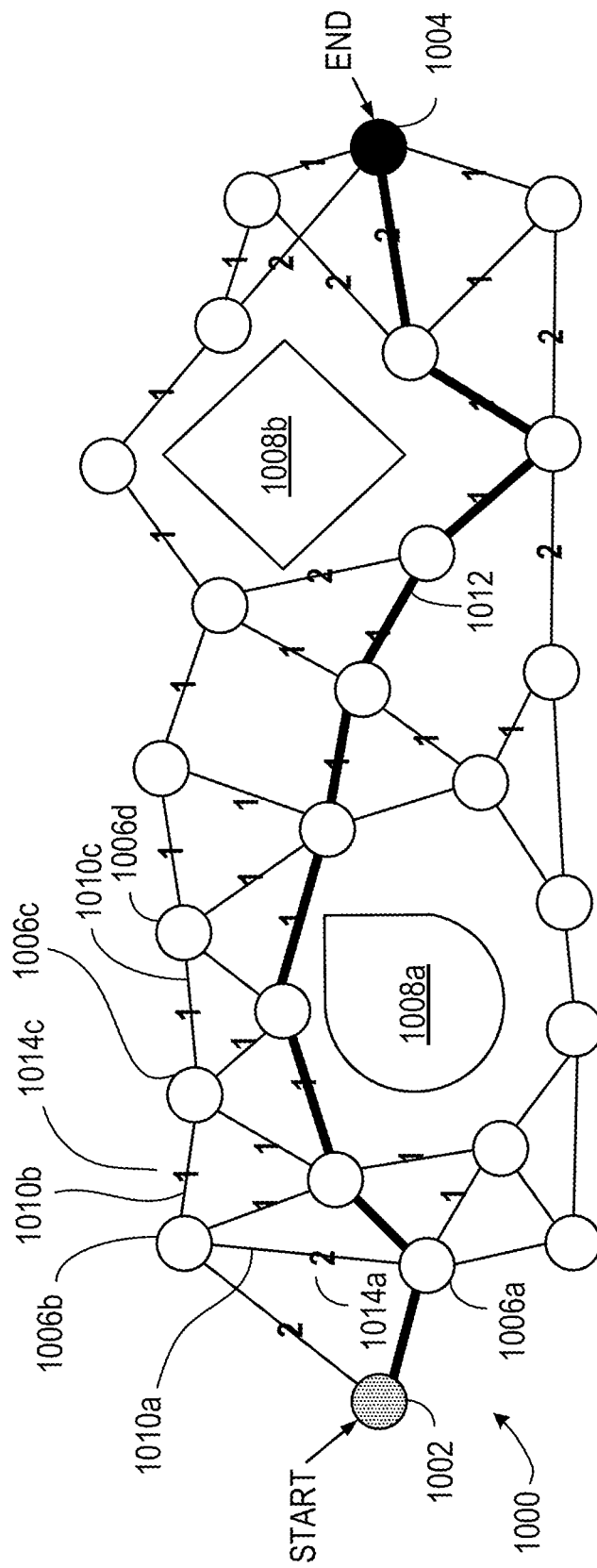
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an vehicle 100 to travel between one node 1006a and the other node 1006b, e.g., without having to travel to an intermediate node before arriving at the other node 1006b. (When we refer to an vehicle 100 traveling between nodes, we mean that the vehicle 100 travels between the two physical positions represented by the respective nodes.) The edges 1010a-c are often bidirectional, in the sense that an vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
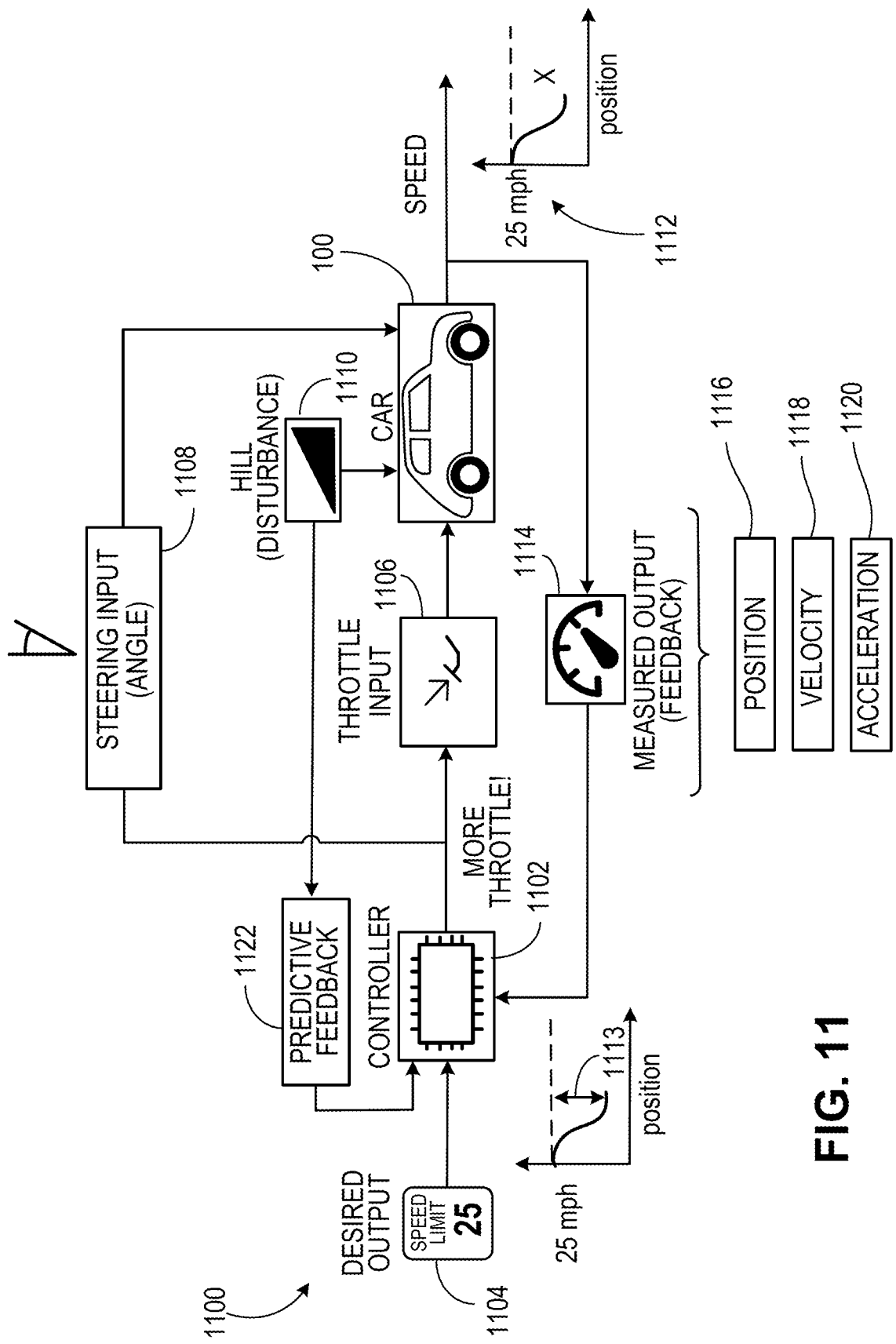
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
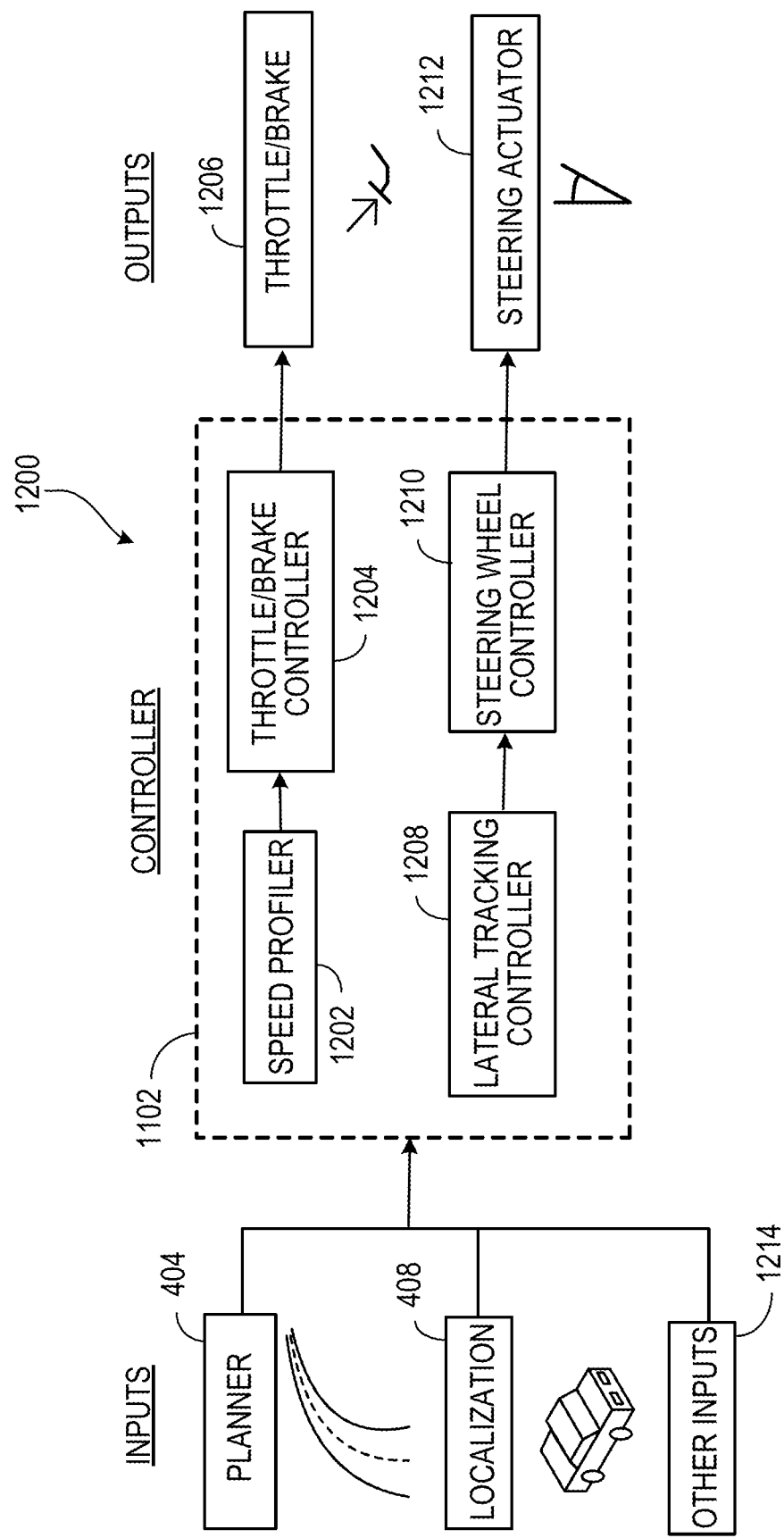
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the vehicle 100 begins operation and to determine which road segment to traverse when the vehicle 100 reaches an intersection. A localization module 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Surface Guided Decision Making

Figure 13A:
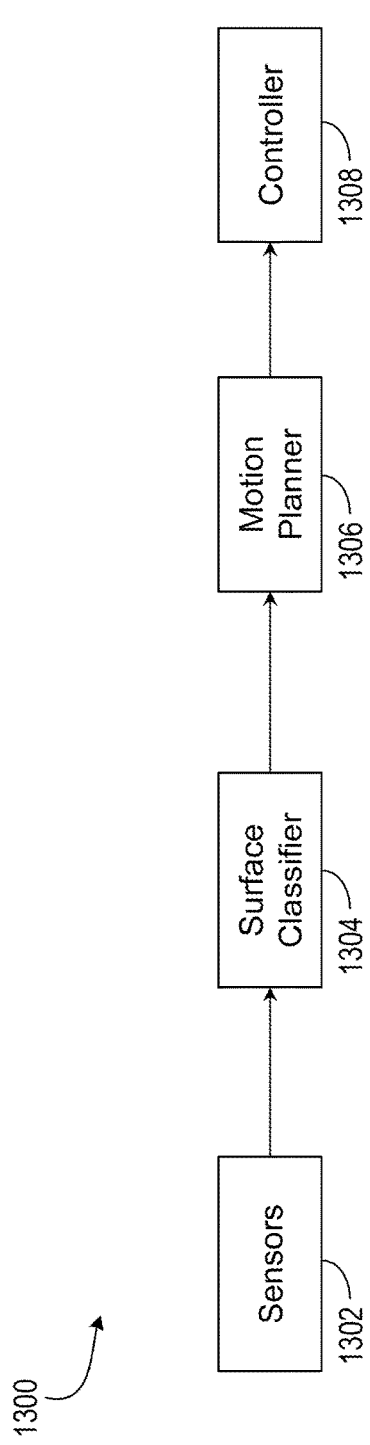
FIG. 13A, FIG. 13B, and FIG. 13C show block diagrams of example systems for surface guided decision making.
Figure 13B:
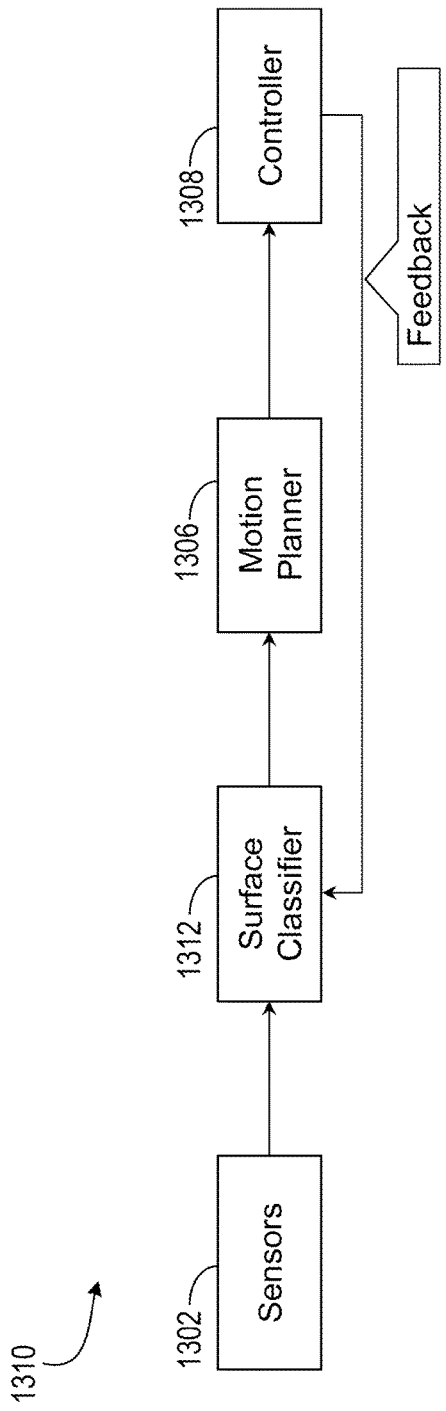
Figure 13C:
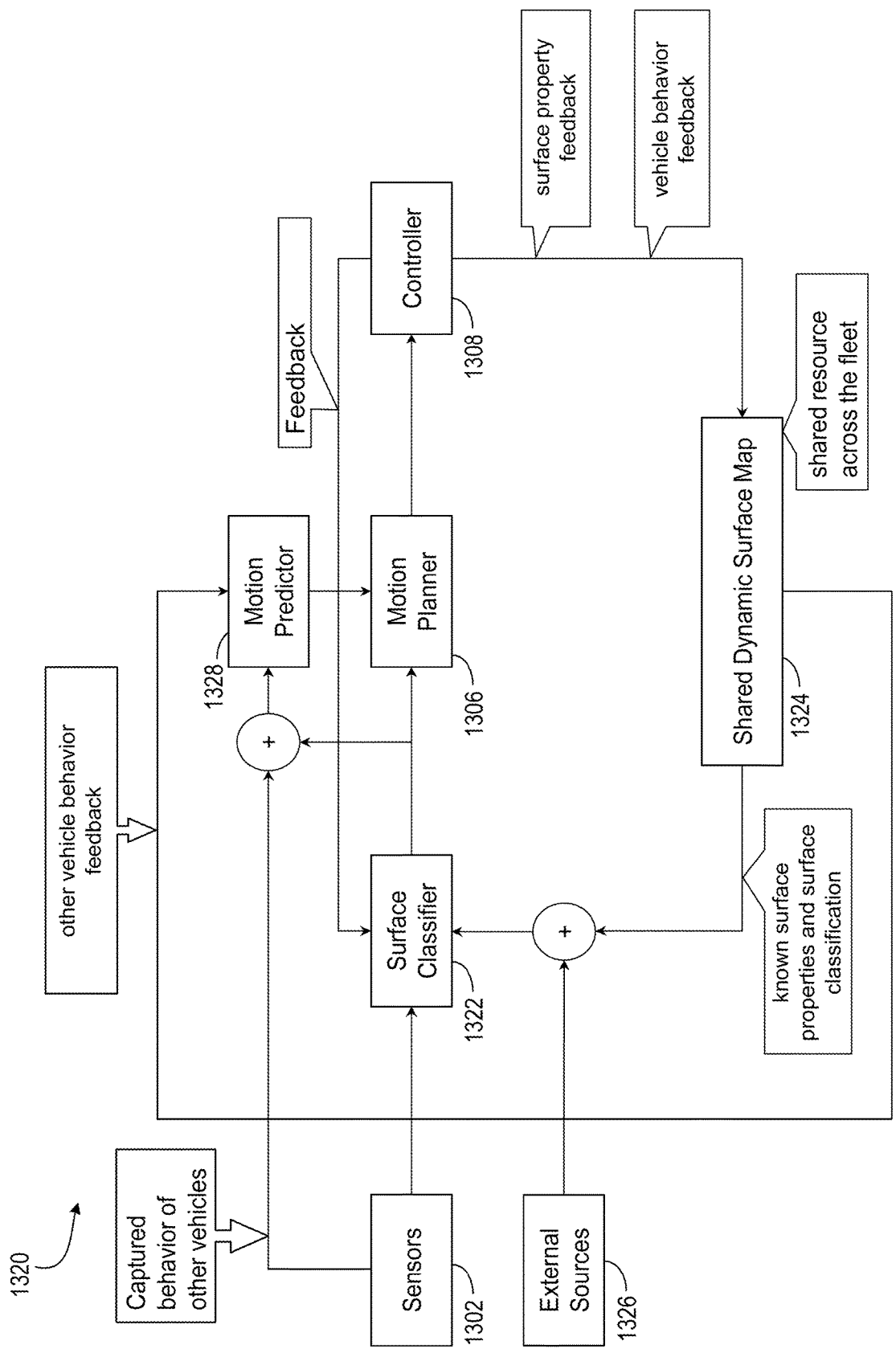

FIG. 13A, FIG. 13B, and FIG. 13C show block diagrams of example systems for surface guided decision making. These systems are configured to classify surfaces along a path of a vehicle (e.g., vehicle 100 shown in FIG. 1). These systems are also configured to control the vehicle based on the classification of the surfaces. The components of the systems can be located onboard the vehicle or remote from the vehicle. In some examples, one or more components are implemented using a computer system similar to the computer system 300 described in FIG. 3. Additionally or alternatively, one or more components can be implemented on a cloud computing environment similar to the cloud computing environment 200 described in FIG. 2. Note that the systems are shown for illustration purposes only, as the systems can include additional components and/or have one or more components removed without departing from the scope of the disclosure. Further, the various components of the systems can be arranged and connected in any manner. Although the following discussion describes the systems in the context of classifying one surface along a vehicle path, the systems can simultaneously or consecutively classify more than one surface along the vehicle path.

FIG. 13A shows an example system 1300 that is configured to use known surface information to classify a surface along a vehicle path. As shown in FIG. 13A, the system 1300 includes sensors 1302 (e.g., sensors that are the same as, or similar to, sensors 121 of FIG. 1), surface classifier 1304, motion planner 1306 (e.g., a motion planner that is the same as, or similar to, planning module 404 described FIG. 4, FIG. 9, and FIG. 10), and controller 1308 (e.g., a controller that is the same as, or similar to, control module 406 described in FIG. 4, FIG. 11, and FIG. 12).

In an embodiment, the sensors 1302 are configured to capture sensor data associated with a surface along a vehicle path. In some examples, the sensors 1302 and the captured sensor data are the same as, or similar to, the inputs 502a-d and outputs 504a-d of FIG. 5, respectively. The possible sensor data includes image data, location data (e.g., GPS coordinates, spatial location, or triangulation data), perception sensor data, weather data (e.g., temperature, humidity, precipitation), wheel rotation sensor data, IMU (e.g., gyroscope and/or accelerometer) data, geometric data (e.g., shape, elevation, dimensions, etc.), and point clouds, among other examples. The surface can be along any portion of the vehicle path. The surface is, for example, along a portion of the vehicle path over which at least one wheel of the vehicle is scheduled to travel. In the example shown in FIG. 13A, the sensors 1302 are configured to send the sensor data to the surface classifier 1304.

In an embodiment, the surface classifier 1304 is configured to use known surface information to classify a surface based on the captured sensor data. The known surface information includes known surface classifications and known properties (e.g., sensor measurements, ranges of sensor measurements, previously labeled data for road surface conditions, and/or the like that were previously generated based on a vehicle moving over the known surface) of the known classifications. In one example, the known surface information is used to train the surface classifier 1304 to classify surfaces. The surface classifier 1304 can be trained using machine-learning algorithms, such as supervised learning. In supervised learning, inputs and corresponding outputs of interest are provided to the surface classifier 1304. The surface classifier 1304 adjusts its functions (e.g., in the case of a neural network, one or more weights associated with two or more nodes of two or more different layers) based on a comparison of the output of the surface classifier 1304 and an expected output in order to provide the desired output when subsequent inputs are provided. Examples supervised learning algorithms include deep neural networks, similarity learning, linear regression, random forests, k-nearest neighbors, support vector machines, and decision trees.

In another example, the surface classifier 1304 classifies a surface by comparing the sensor data to properties of known surface classifications. In this example, if the surface classifier 1304 identifies a threshold similarity between the sensor data and the properties of a known surface classification, then the surface classifier 1304 classifies the surface with that surface classification. The threshold similarity is a measure of similarity between the sensor readings and the known properties that is greater than a predetermined threshold (e.g., the sensor readings and the known properties are greater than 90% similar). For instance, a k-nearest neighbors algorithm can be used to compare the sensor data to properties of known surface classifications.

In another example, the surface classifier 1304 uses regression to quantify a road surface. In this example, after the surface classifier 1304 classifies a surface as having a particular property, the surface classifier 1304 can quantify an extent that the surface has that property. For instance, a surface can be classified "icy," and then regression is used to estimate an extent of "iciness", perhaps on a scale of 0-10. Alternatively, regression can be used to directly estimate the coefficient of friction. Regression can be trained in a similar manner as classification. For example, supervised learning can be used. More specifically, the training data consists of road surfaces that are labeled with ground truth properties (e.g., coefficient of friction, water depth, etc.). Example regression models include (deep) neural networks, linear regression, and support vector machines (SVMs).

In an embodiment, the surface classification is based on a surface composition or a surface property. The surface composition is a manufactured material (e.g., asphalt, concrete, tar, bricks) or a naturally occurring element (e.g., rain, snow, sand, rocks). As such, the possible surface classifications include an asphalt surface, a concrete surface, a tar surface, a brick surface, a rain surface, a snow surface, a sand surface, a rock surface, among other examples. The surface property is a shape of the surface, whether the vehicle can drive over the surface (e.g., an obstacle), a coefficient of friction, or any property of the surface having a value with respect to a threshold. As such, a surface can be classified based on its shape, whether or not it is an obstacle, or whether the surface has a property value greater than, equal to, or less than a threshold. The surface classification of temporary surfaces (e.g., a temporary natural element, such as snow or rain) includes a temporal description. For example, a snow surface is classified according to a length of time that it has existed (e.g., freshly packed snow, day old snow, etc.).

In some scenarios, the surface classifier 1304 determines that a classification cannot be determined for the surface based on the known surface information (e.g., the surface classifier 1304 does not identify a known surface classification with similar properties to the surface). In these scenarios, the surface classifier 1304 classifies the surface as an unknown surface. As shown in FIG. 13A, the surface classifier 1304 provides the surface classification to the motion planner 1306. In some examples, the surface classifier 1304 also provides the motion planner 1306 with the sensor data associated with the surface.

In an embodiment, the motion planner 1306 is configured to determine a vehicle behavior based on the surface classification. In an example, the motion planner 1306 first determines drivability properties of the surface based on the surface classification. Drivability properties can include physical characteristics that affect the manner in which a vehicle drives over the surface. Example drivability properties include friction, traction, road grip, resistance, rolling resistance, obstruction, among other properties. If the surface classification is known to the system 1300, the motion planner 1306 obtains from a database of drivability properties associated with the known surface classification. In some examples, the motion planner 1306 also generates a surface map that includes a list of geometric descriptions of the surface (e.g., generated based on the sensor data) and/or a distribution of the drivability properties of the surface.

In an embodiment, the motion planner 1306 determines the vehicle behavior based on the drivability properties of the surface. In one example, the motion planner 1306 determines the vehicle behavior based on known vehicle behaviors (e.g., historical vehicle behaviors). More specifically, the motion planner 1306 determines the vehicle behavior based on a known vehicle behavior associated with the known surface classification or a surface with similar drivability properties. Example vehicle behaviors include: following existing tracks (e.g., on a rainy or snowy surface), avoiding certain surfaces (e.g., avoiding ice patches), adjusting vehicle speed or torque, biasing within a lane, changing lanes, and defining a new center lane (e.g., to increase friction on a road surface that is partially covered with snow or rain). In examples where the surface classification is unknown, the motion planner 1306 determines a precautionary vehicle behavior (e.g., reducing speed and avoiding the surface if possible). Once the motion planner 1306 determines the vehicle behavior, the motion planner 1306 provides the determined vehicle behavior to the controller 1308. The controller 1308 then controls the vehicle based on the determined vehicle behavior.

FIG. 13B illustrates an example system 1310 that is configured to use known surface information and feedback from a vehicle controller to classify a surface along a vehicle path. As shown in FIG. 13B, like the system 1300, the system 1310 includes the sensors 1302, the motion planner 1306, and the controller 1308. However, unlike the surface classifier 1304, a surface classifier 1312 of the system 1310 receives feedback from the controller 1308.

In an embodiment, in addition to using known surface information to classify surfaces, the surface classifier 1312 also uses feedback from the controller 1308. The feedback is used to generate new surface classifications or to refine known surface classifications. The feedback includes sensor measurements captured when the vehicle was near a surface (e.g., within a threshold distance) or driving on the surface. In examples where the surface has a known classification, the surface classifier 1312 uses the feedback to update the properties of the classification (that is, update the output of the classification). And in examples where the surface has an unknown classification, the surface classifier 1312 uses the feedback to generate a new surface classification. The surface classifier 1312 includes the feedback as properties of the new surface classification. For example, the new surface classification includes the feedback as labels used to identify the new surface classification. The new surface classification and/or the updated surface classification is used by the surface classifier 1312 for classifying surfaces (e.g., using the techniques described above with respect to surface classifier 1304).

FIG. 13C illustrates an example system 1320 that is configured to use known surface information, feedback from a vehicle controller, shared data across a vehicle fleet, and data from external sources to classify a surface along a path of a vehicle. The system 1320 is also configured to predict, based on the surface classification, a vehicle behavior of one or more other vehicles near or driving on the surface. The system is also configured to use the captured behavior of the other vehicles to estimate the road surface (e.g., a slipping vehicle can indicate a slippery surface) and to determine appropriate driving behaviors. Further, the system 1320 is configured to control a behavior of the vehicle based on the surface classification and/or the predicted behavior of the one or more other vehicles. As shown in FIG. 13C, like the systems 1300 of FIG. 13A and 1310 of FIG. 13B, the system 1320 includes the sensors 1302, the motion planner 1306, and the controller 1308. The system 1320 also includes surface classifier 1322, shared dynamic surface map 1324, external sources 1326, and motion predictor 1328.

In an embodiment, in addition to capturing data associated with a surface along a vehicle path, the sensors 1302 are also configured to capture sensor data indicative of the behavior of other vehicles that are near the surface or driving on the surface. As shown in FIG. 13C, the captured behavior of other vehicles is provided to the motion predictor 1328. As described below, the captured behavior of other vehicles is used to train the motion predictor 1328 to predict the behavior of one or more other vehicles that are near or driving on a surface along a vehicle path.

In an embodiment, the shared dynamic surface map 1324 is a database (e.g., a database including a map) shared across a fleet of vehicles. The shared dynamic surface map 1324 receives information from the vehicles of the fleet and shares that information in the database. For example, the shared dynamic surface map 1324 receives from vehicle controllers, such as the vehicle controller 1308, surface property feedback and vehicle behavior feedback. The surface property feedback includes sensor measurements captured when a vehicle was near a surface or driving on a surface. The vehicle behavior feedback includes information indicative of a vehicle trajectory and/or vehicle driving settings (e.g., speed or torque) when the vehicle was near a surface or driving on a surface. In some examples, the shared dynamic surface map 1324 receives information associated with a temporary surface (e.g., a metal plate that is temporarily placed over an opening in a road surface, a grated road surface, and/or the like). In such examples, the shared dynamic surface map 1324 schedules the information to expire after a specified amount of time. The amount of time after which the information expires can be associated with (e.g., depend on) the type of the surface (e.g., information associated with a first temporary surface (e.g., a metal plate) can expire in an amount of days whereas information associated with second temporary surface (e.g., a grated road surface) can expire in an amount of days or an amount of weeks). As shown in FIG. 13C, the surface classifier 1322 receives known surface information (e.g., known surface properties and surface classifications) from the shared dynamic surface map 1324. The known surface information is used by the surface classifier 1322 to classify surfaces. Further, the motion predictor 1328 receives vehicle behavior feedback from the shared dynamic surface map 1324. The vehicle behavior feedback is used by the motion predictor 1328 to predict the behavior of other vehicles.

In an embodiment, the external sources 1326 include databases that provide information associated with surfaces along a vehicle path. For example, the external sources 1326 include weather databases and/or construction databases that provide weather information and construction information for areas along the vehicle path. As shown in FIG. 13C, the surface classifier 1322 receives data from the external sources. The surface classifier 1322 uses the data to classify surfaces.

In an embodiment, the surface classifier 1322 is configured to receive sensor data from sensors 1302, feedback from the controller 1308, shared data from the shared dynamic surface map 1324, and/or external data from external sources 1326. In an example, the feedback from the controller 1308, shared data from the shared dynamic surface map 1324, and/or external data from external sources 1326 is used to train the surface classifier 1322 to classify surfaces (e.g., using the techniques described above with respect to surface classifier 1304 and surface classifier 1312). For example, the data is used to generate new surface classifications or to refine known surface classifications. The surface classifications are used to classify a surface based on the sensor data received from the sensors 1302.

In an embodiment, the surface classifier 1322 receives sensor data indicative of the behavior of another vehicle that is near the surface or driving on the surface. In this embodiment, the surface classifier 1322 uses vehicle behavior to classify the surface on which the other vehicle is driving. For example, if the vehicle is slipping or sliding, the surface classifier 1322 determines that the surface is a slippery surface. As described below, the surface classification can be used to determine a vehicle behavior, e.g., determining a top speed based on the surface classification. As shown in FIG. 13C, the surface classifier 1322 provides the surface classification to the motion planner 1306 and the motion predictor 1328.

In an embodiment, the motion predictor 1328 is configured to predict, based on a classification of a surface received from the surface classifier 1322, the behavior of another vehicle that is near the surface or driving on the surface. In one example, known vehicle behavior, other vehicle behavior feedback received from the shared dynamic surface map 1324, and/or captured vehicle behavior of other vehicles received from the sensors 1302 is used to train the motion predictor 1328 to predict the behavior of other vehicles. More specifically, the motion predictor 1328 can implement one or more machine-learning algorithms, such as supervised learning and reinforcement learning. In such an example, the motion predictor 1328 can be trained using the known vehicle behaviors, the other vehicle behavior feedback, and/or the captured vehicle behavior of other vehicles. In another example, the motion predictor 1328 predicts the behavior of another vehicle by comparing how an observed vehicle behaves with how vehicles have historically behaved when near the surface or driving on the surface. As shown in FIG. 13C, the motion predictor 1328 provides the predicted vehicle behavior to the motion planner 1306.

In an embodiment, the motion planner 1306 is configured to determine a vehicle behavior based on the surface classification received from the surface classifier 1322 and/or the predicted vehicle behavior received from the motion predictor 1328. More specifically, the motion planner 1306 determines the vehicle behavior based on the surface classification drivability properties of the surface. The motion planner 1306 then determines the vehicle behavior based on the drivability properties of the surface and/or the predicted vehicle behavior of another vehicle that is near the surface or driving on the surface. As an example, the motion planner 1306 determines a vehicle behavior that causes the vehicle to drive in the track of other vehicles while it is snowing (e.g., to maximize the friction and minimize the risk of losing control). As another example, the motion planner 1306 determines the vehicle behavior based on historical vehicle behaviors on surfaces with the same or similar drivability properties. As yet another example, the motion planner 1306 determines a vehicle behavior that follows or avoids the other vehicle that is reacting to the surface. In some examples, the motion planner 1306 also determines a vehicle behavior that is associated with a safety or performance value that is greater than a current safety or performance value associated with a current vehicle behavior. The motion planner 1306 provides the controller 1308 with the vehicle motion.

In an embodiment, the controller 1308 then controls the vehicle based on the determined vehicle behavior. As shown in FIG. 13C, the controller 1308 also sends feedback to the surface classifier 1322. Further, the controller 1308 sends surface property feedback and/or vehicle behavior feedback to the shared dynamic surface map 1324. In some examples, the controller 1308 sends vehicle behavior feedback to the motion planner 1306.

Figure 14:
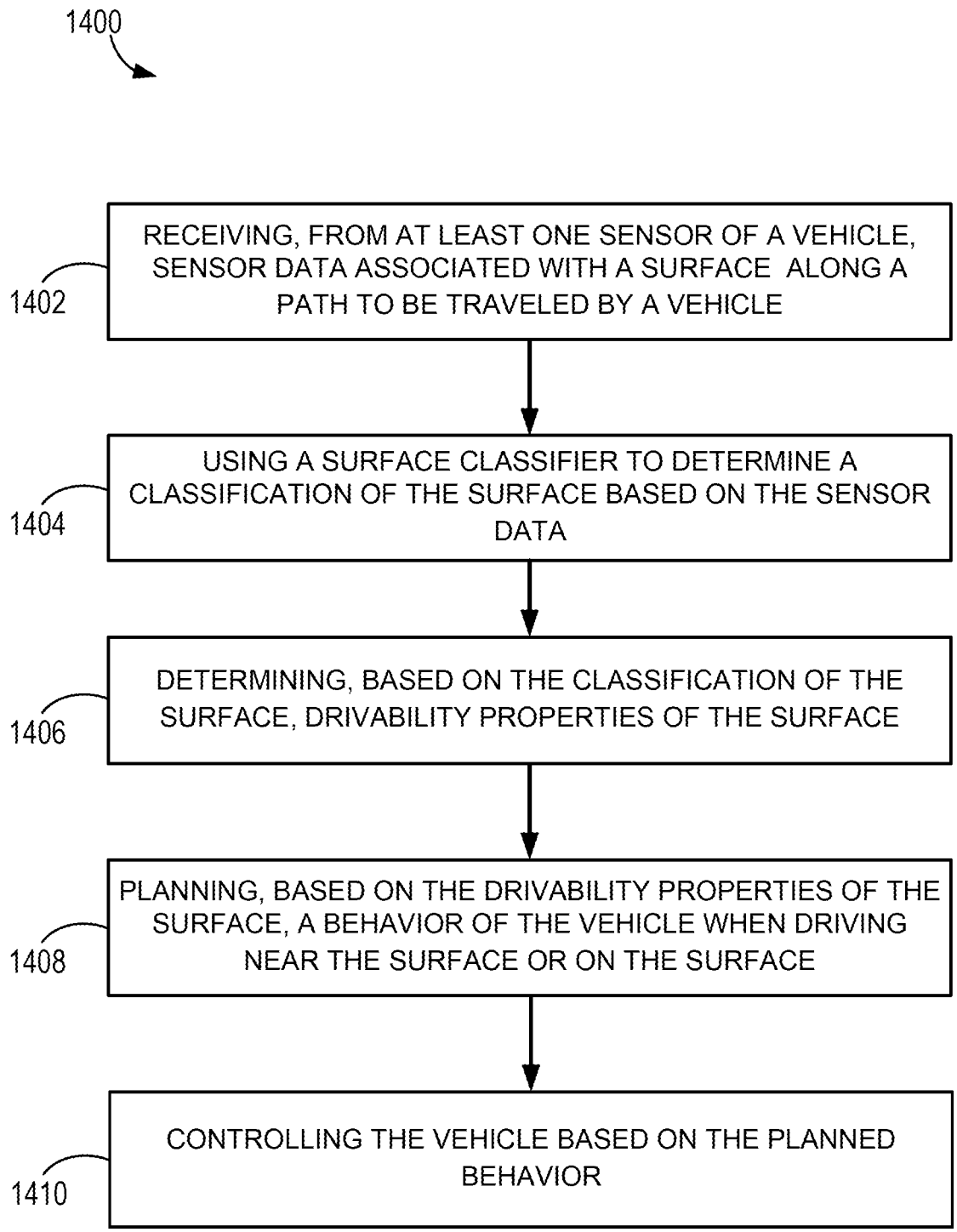
FIG. 14 shows a flowchart of an example method.

FIG. 14 shows a flowchart of a process 1400 for surface guided decision making. For example, the process could be carried out by the system 1300 of FIG. 13A, the system 1310 of FIG. 13B, or the system 1320 of FIG. 13C. Sensor data associated with a surface (e.g., image of the surface, scan of the surface, or a location of the surface) along a path to be traveled by a vehicle is received 1402 from at least one sensor (e.g., a camera, LiDAR [described in FIG. 6, FIG. 7, and FIG. 8], radar, or a location sensor) of the vehicle.

A surface classifier is used to determine 1404 a classification of the surface (e.g., type of surface or material on the surface, such as snow, ice, sand, chemicals [e.g., oil or paint], pebbles, rock, dust, or any other material that changes the drivability of the surface) based on the sensor data. Drivability properties of the surface (e.g., such as friction, traction, road grip, resistance, rolling resistance, obstruction) are determined 1406 based on the classification of the surface.

A behavior of the vehicle when driving near the surface or on the surface is planned based on the drivability properties of the surface at 1408. Examples of the behavior include determining a motion that accounts for the drivability properties, determining the motion based on previous vehicle motion (either the vehicle or another vehicle) on surfaces with the same or similar drivability properties, determining the motion based on the predicted motion of another vehicle driving on the surface, following existing tracks on the road when it is snowing or raining, avoiding ice patches, reducing speed, biasing within a lane, changing lanes to avoid an obstacle, defining a new center lane (baseline) path to increase friction on road surface that is partially covered with snow, reduce speed/torque over compromised road segments, follow or avoid another vehicle that is reacting to the surface. The vehicle is controlled based on the behavior of the vehicle at 1410.

In some implementations, determining, based on the surface classification, drivability properties of the surface involves generating a surface map that includes at least one of: a list of geometric descriptions of the surface or a distribution of the drivability properties on the path of the vehicle.

In some implementations, the surface classification includes a known surface, and determining, based on the surface classification, drivability properties of the surface involves obtaining, from a database, drivability properties associated with the known surface.

In some implementations, the surface classification is an unknown surface, and determining, based on the surface classification, drivability properties of the surface involves: determining, from a database, sensor measurements included in a label of the unknown surface, wherein the sensor measurements are historical sensor measurements associated with the unknown surface; and determining the drivability properties of the unknown surface based on the sensor measurements.

In some implementations, the historical sensor measurements are measured by the vehicle or received from another vehicle.

In some implementations, planning, based on the drivability properties of the surface, a behavior of the vehicle when driving near the surface or on the surface involves determining, based on the drivability properties, a vehicle motion that is associated with a safety or performance value that is greater than a current safety or performance value associated with a current vehicle motion.

In some implementations, the surface is a first surface, and planning, based on the drivability properties of the surface, a behavior of the vehicle when driving near the surface or on the surface involves determining a historical vehicle motion performed on a second surface that has properties similar to the drivability properties of the first surface.

In some implementations, the vehicle is a first vehicle, and planning, based on the drivability properties of the surface, a behavior of the vehicle when driving near the surface or on the surface involves detecting a second vehicle in proximity of the first vehicle; determining, based on the drivability properties of the surface, an expected motion of the second vehicle; and determining, based on the expected motion of the second vehicle, the behavior of the first vehicle.

In some implementations, the surface classifier receives, from the at least one sensor, sensor measurements performed when the vehicle drives over the surface.

In some implementations, the surface classification is a known surface classification, and the process 1400 further involves updating, based on the sensor measurements, a classifier associated with the surface classification.

In some implementations, the surface classification is an unknown surface, and wherein the process 1400 further involves adding the sensor measurements to a label associated with the unknown surface.

In some implementations, the process 1400 further involves receiving from a shared dynamic database at least one of a road surface classification information or known surface property information.

In some implementations, the vehicle is a first vehicle, and the method 1400 further involves capturing, using the at least one sensor, a motion of a second vehicle that is driving on the surface.

In some implementations, the process 1400 further involves sending to a shared dynamic database at least one of: surface property feedback or vehicle motion feedback when the vehicle drives on the surface.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising", in the foregoing description or following claims, what follows this phrase can be an additional step or entity, or a sub-step/sub-entity of a previously-recited step or entity.

What is claimed is:

1. A system, comprising:
   at least one non-transitory computer-readable medium storing computer-executable instructions;
   at least one processor configured to communicate with at least one sensor and to execute the computer-executable instructions, the execution carrying out operations including:
   receiving, from the at least one sensor, sensor data associated with a surface along a path to be traveled by a vehicle;
   determining a surface classification of the surface based on the sensor data;
   determining, based on the surface classification, drivability properties of the surface;

planning, based on the drivability properties of the surface, a behavior of the vehicle when driving near the surface or on the surface;

controlling the vehicle based on the planned behavior; and sending to a shared dynamic database at least one of: surface property feedback or vehicle behavior feedback when the vehicle drives near the surface or on the surface.

2. The system of claim 1, wherein determining, based on the surface classification, the drivability properties of the surface comprises:

generating a surface map that includes at least one of: a list of geometric descriptions of the surface or a distribution of the drivability properties of the surface on the path of the vehicle.

3. The system of claim 1, wherein the surface classification includes a known surface, and wherein determining, based on the surface classification, the drivability properties of the surface comprises:

obtaining, from a database, drivability properties associated with the known surface.

4. The system of claim 1, wherein the surface classification includes an unknown surface, and wherein determining, based on the surface classification, the drivability properties of the surface comprises:

determining, from a database, sensor measurements included in a label of the unknown surface, wherein the sensor measurements are historical sensor measurements associated with the unknown surface; and determining the drivability properties of the surface based on the sensor measurements.

5. The system of claim 4, wherein the historical sensor measurements are measured by the vehicle or received from another vehicle.

6. The system of claim 1, wherein planning, based on the drivability properties of the surface, the behavior of the vehicle when driving near the surface or on the surface comprises:

determining, based on the drivability properties of the surface, a vehicle motion that is associated with a safety or performance value that is greater than a current safety or performance value associated with a current vehicle motion.

7. The system of claim 1, wherein the surface is a first surface, and wherein planning, based on the drivability properties of the surface, the behavior of the vehicle when driving near the surface or on the surface comprises:

determining a historical vehicle motion performed on a second surface that has properties similar to drivability properties of the first surface.

8. The system of claim 1, wherein the vehicle is a first vehicle, and wherein planning, based on the drivability properties of the surface, the behavior of the vehicle when driving near the surface or on the surface comprises:

detecting a second vehicle in proximity of the first vehicle;

determining, based on the drivability properties of the surface, an expected motion of the second vehicle; and determining, based on the expected motion of the second vehicle, the behavior of the first vehicle.

9. The system of claim 1, the operations further comprising: wherein the receiving, from the at least one sensor, sensor measurements performed when the vehicle drives near the surface or on the surface.

10. The system of claim 9, wherein the surface classification is a known surface classification, and wherein the operations further comprise:

updating, based on the sensor measurements, properties of the surface classification.

11. The system of claim 9, wherein the surface classification is an unknown surface, and wherein the operations further comprise:

adding the sensor measurements to a label associated with the unknown surface.

12. The system of claim 1, the operations further comprising:

receiving from the shared dynamic database at least one of a road surface classification information or known surface property information.

13. The system of claim 1, wherein the vehicle is a first vehicle, and wherein the operations further comprise:

capturing, using the at least one sensor, a motion of a second vehicle that is driving on the surface.

14. A method comprising:

receiving, from at least one sensor of a vehicle, sensor data associated with a surface along a path to be traveled by the vehicle;

determining a surface classification of the surface based on the sensor data;

determining, based on the surface classification, drivability properties of the surface;

planning, based on the drivability properties of the surface, a behavior of the vehicle when driving near the surface or on the surface; and controlling the vehicle based on the planned behavior; and sending to a shared dynamic database at least one of: surface property feedback or vehicle behavior feedback when the vehicle drives near the surface or on the surface.

15. A non-transitory computer-readable storage medium comprising at least one program for execution by at least one processor of a first device, the at least one program including instructions which, when executed by the at least one processor, cause the first device to perform the method of claim 14.

* * * * *